Patented Mar. 17, 1942

2,276,553

UNITED STATES PATENT OFFICE 2,276,553

THIOCARBONATES AND IMINO-THIOCARBONATES OF AROMATIC POLYHYDROXY COMPOUNDS

Georg Werner, Wiesbaden-Biebrich, Germany, assignor, by mesne assignments, to Winthrop Chemical Company, Inc., New York, N. Y., a corporation of New York No Drawing. Application March 24, 1939, Serial No. 263,903. In Germany March 29, 1938

5 Claims. (Cl. 260—327)

The present invention relates to new products which may be characterized as imino-thiocarbonates, of aromatic poly-hydroxy compounds. They may also be designated as thiocarbonic acid O.S(1.2)-hydroxy-arylene ester imides. The new compounds correspond with the following formula:

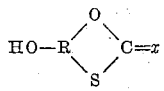

wherein R stands for a benzene or naphthalene ring and $x$ stands for an imino group, the heterocyclic ring being bound to the aromatic ring in 1.2-position.

I have found that the above-mentioned imino-thiocarbonates of aromatic poly-hydroxy compounds may be obtained by causing an agent yielding thiocyanogen to act upon an aromatic poly-hydroxy compound containing, with respect to one of the hydroxyl groups, a free ortho-position preferred for substitution and neutralizing the thiocyanic acid formed during the reaction. The process is preferably performed in an aqueous solution; other solvents may, however, also be used. As an agent yielding thiocyanogen there is preferably used cupric thiocyanate. This cupric thiocyanate may be produced within the reaction solution by causing a cupric salt to react with an alkali thiocyanate or with an alkaline earth metal thiocyanate, such as $Ca(SCN)_2$. Suitable poly-hydroxy compounds are poly-hydroxy compounds of the benzene and naphthalene series which may be substituted, for instance, by halogen atoms or by alkyl or aryl radicals, such as resorcinol, cresorcinol, orcinol, phloroglucinol, dihydroxy-naphthalenes and the like. The poly-hydroxy compounds may also contain as substituents etherified hydroxy groups such as alkoxy groups. Thus, there may be used as parent material, for instance 1.3-dihydroxy-5-ethoxybenzene, 1.3-dihydroxy-6-methoxybenzene or 1.4-dihydroxy-5-methoxybenzene, provided that these compounds contain, with respect to one hydroxyl group, a free ortho-position preferred for substitution, so that the thio-cyano radical enters this free ortho position. The neutralization of the thiocyanic acid formed as a by-product then brings about ring closure to the imino-thio-carbonate. The imino-thio-carbonates of poly-hydroxy compounds of the benzene or naphthalene series constitute new products which are very suitable intermediate products in the manufacture of medicines, dyestuffs and the like. The imino-thio-carbonates are, for instance, also very suitable for being used as azo components in the production of diazotypes.

The following examples serve to illustrate the invention, but they are not intended to limit it thereto:

(1) 40 grams of potassium thio-cyanate in 50 cc. of water are added, while stirring at room temperature, to a solution of 11 grams of resorcinol and 50 grams of crystallized copper sulfate in 250 cc. of water. The black cupric thiocyanate formed becomes colorless after a short time, which indicates that the introduction of thiocyanogen is terminated. The cuprous thiocyanate is removed by filtering with suction and then washed with water; the filtrate is mixed with 50 cc. of a 2n-sodium carbonate solution, whereby the imino-thiocarbonate of resorcinol

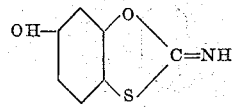

separates in the form of a colorless crystalline body. The yield amounts to 16 grams. The new compound which melts at 149° C. dissolves very easily in many organic solvents and in mineral acids. It forms well-defined salts.

(2) 50 grams of crystallized copper sulfate in 100 cc. of water are added, while stirring, at room temperature to a solution of 16.2 grams of crystallized phloroglucinol and 36 grams of sodium thiocyanate of 90 per cent. strength in 100 cc. of water. The cupric thiocyanate which is first formed becomes nearly instantaneously colorless which proves that the thiocyanation has occurred very quickly. The solution is freed from the cuprous thiocyanate and the thiocyanic acid is neutralized by means of a 2n-sodium carbonate solution; the imino-thiocarbonate of phloroglucinol

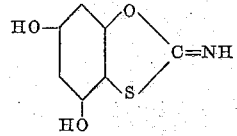

thereby separates. Any excess of sodium carbonate should be avoided since it would again bring about dissolution. The new product thus obtained dissolves very easily in dilute acids; its hydrochloride forms very well-defined crystals.

(3) 12.6 grams of anhydrous phloroglucinol in 50 cc. of alcohol are mixed, while stirring, with 40 grams of cupric thiocyanate. The black cupric salt is soon decolorized while forming the corresponding cuprous salt, which indicates that the reaction is terminated. The cuprous thiocyanate is removed by filtering with suction and the filtrate is mixed with 45 cc. of a 2n-sodium carbonate solution; on cooling and scratching, the new imino-thiocarbonate of phloroglucinol separates. It is filtered with suction, washed with water and, by means of hydrochloric acid, transformed into the colorless hydrochloride. The yield is very good.

(4) 12.4 grams of anhydrous orcinol and 40 grams of cupric thiocyanate are stirred together in 70 cc. of methanol. As soon as the mixture has completely decolorized, the cuprous thiocyanate is filtered with suction; by addition of 50 cc. of 2n-sodium carbonate solution to the filtrate, the imino-thiocarbonate of orcinal

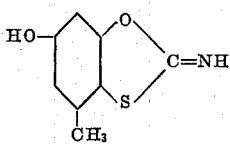

is precipitated. Recrystallized from alcohol, the product melts after first becoming brown at 174° C.-175° C.

(5) 12.4 grams of 2.6-dihydroxytoluene are dissolved in 100 cc. of alcohol of 50% strength, and there is added a mixture of 50 grams of crystallized copper sulfate in 100 cc. of water and 36 grams of sodium thiocyanate of 90% strength in 50 cc. of water. As soon as decoloration has occurred, the reaction mixture is filtered with suction and the imino-thiocarbonate of 2.6-dihydroxytoluene

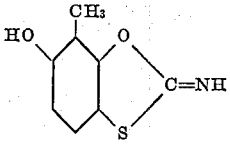

is precipitated by addition to the filtrate of dilute sodium carbonate solution. The imino-compound dissolves easily in mineral acids and forms well-defined salts.

(6) 14.5 grams of 1-chloro-2.4-dihydroxybenzene and 50 grams of crystallized copper sulfate are dissolved in 250 cc. of water, and 40 grams of potassium thiocyanate in 50 cc. of water are then added, while stirring. Decoloration immediately sets in. The imino-thiocarbonate of 1-chloro-2.4-dihydroxybenzene

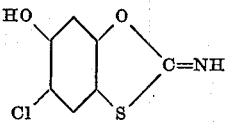

melts at 172° C.

(7) 16 grams of 2.3-dihydroxynaphthalene are dissolved in 100 cc. of alcohol and mixed, while stirring, with 40 grams of cupric thiocyanate. As soon as all of the cupric salt has been transformed into the cuprous salt, the reaction mixture is filtered and the imino-thiocarbonate of 2.3-dihydroxynaphthalene

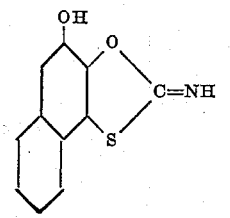

is precipitated by addition of sodium carbonate solution. The product thus obtained melts at 180° C.-181° C.; its hydrochloride is difficultly soluble in water.

The same reaction may be carried out, for instance with 2.7-dihydroxy-naphthalene whereby a product of the formula

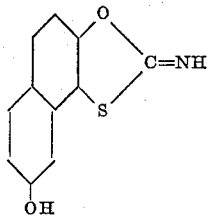

is obtained.

I claim:

1. As a new product, a substance of the following general formula:

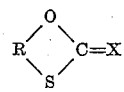

wherein X stands for an imino group and R for an aromatic nucleus selected from the group consisting of the benzene nucleus and the naphthalene nucleus, which nucleus R carries at least one hydroxyl group as substituent and the further positions of R are occupied by substituents selected from the group consisting of hydrogen, methyl, hydroxy, methoxy, ethoxy and halogen, the heterocyclic ring being bound to the aromatic nucleus in 1.2-position.

2. As a new product, a substance of the following general formula:

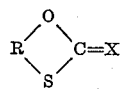

wherein X stands for an imino group and R for a benzene nucleus which carries a hydroxyl group as substituent in para-position to the sulfur atom and the further positions of R are occupied by substituents selected from the group consisting of hydrogen, methyl, hydroxy, methoxy, ethoxy and halogen, the heterocyclic ring being bound to the benzene nucleus in 1.2-position.

3. As a new product, a substance of the following formula:

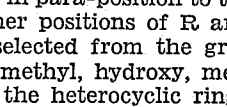

4. As a new product, a substance of the following formula:

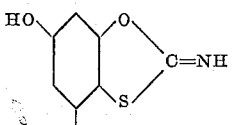

5. As a new product, a substance of the following formula:

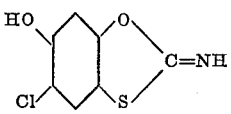

GEORG WERNER.